(12) United States Patent
Wu et al.

(10) Patent No.: US 11,574,199 B2
(45) Date of Patent: Feb. 7, 2023

(54) GENERATIVE ADVERSARIAL NETWORK DEVICE AND TRAINING METHOD THEREOF

(71) Applicant: Tsinghua University, Beijing (CN)

(72) Inventors: Huaqiang Wu, Beijing (CN); Bin Gao, Beijing (CN); Yudeng Lin, Beijing (CN); He Qian, Beijing (CN)

(73) Assignee: Tsinghua University, Beijing (CN)

( * ) Notice: Subject to any disclaimer, the term of this patent is extended or adjusted under 35 U.S.C. 154(b) by 582 days.

(21) Appl. No.: 16/699,727

(22) Filed: Dec. 1, 2019

(65) Prior Publication Data
US 2020/0175379 A1  Jun. 4, 2020

(30) Foreign Application Priority Data
Dec. 2, 2018 (CN) .......................... 201811461559.9

(51) Int. Cl.
*G06N 3/08* (2006.01)
*G06N 3/04* (2006.01)
*G06N 3/06* (2006.01)

(52) U.S. Cl.
CPC ........... *G06N 3/088* (2013.01); *G06N 3/0454* (2013.01); *G06N 3/061* (2013.01)

(58) Field of Classification Search
CPC ........ G06N 3/0454; G06N 3/08; G06N 3/088; G06N 3/04; G06N 3/061; G06N 3/02; G06N 3/06
See application file for complete search history.

(56) References Cited

FOREIGN PATENT DOCUMENTS

| CN | 106650922 | * | 5/2017 | ............. G06N 3/063 |
|---|---|---|---|---|
| CN | 106650922 | A | 5/2017 | |
| CN | 107945204 | A | 4/2018 | |
| CN | 108334816 | A | 7/2018 | |
| CN | 108595916 | * | 9/2018 | ............. G16B 25/00 |
| CN | 108595916 | A | 9/2018 | |
| CN | 108897740 | A | 11/2018 | |
| CN | 108921123 | A | 11/2018 | |

OTHER PUBLICATIONS

China National Intellectual Property Administration, First Office Action, dated Mar. 27, 202, 12 pages.

* cited by examiner

Primary Examiner — Tuan H Nguyen
(74) Attorney, Agent, or Firm — Loeb & Loeb LLP

(57) ABSTRACT

A generative adversarial network device and a training method thereof. The generative adversarial network device includes a generator and a discriminator. The generator is configured to generate a first sample according to an input data; the discriminator is coupled to the generator, and is configured to receive the first sample and be trained based on the first sample; the generator includes a first memristor array serving as a first weight array. The generative adversarial network device can omit a process of adding noise to fake samples generated by the generator, thereby saving training time, reducing resource consumption and improving training speed of the generative adversarial network.

10 Claims, 5 Drawing Sheets

GENERATIVE ADVERSARIAL NETWORK DEVICE AND TRAINING METHOD THEREOF

CROSS-REFERENCE TO RELATED APPLICATION

The present application claims priority of the Chinese Patent Application No. 201811461559.9, filed on Dec. 2, 2018 and entitled "Generative Adversarial Network Device and Training Method Thereof", the disclosure of which is incorporated herein by reference in its entirety as part of the present application.

TECHNICAL FIELD

Embodiments of the present disclosure generally relate to a generative adversarial network device and a training method thereof.

BACKGROUND

In the field of neuromorphic technology, the data processing capability and machine learning capability of a computer can be greatly improved by constructing a computing architecture similar to the structure of a human brain. Compared with the implementation of serial software based on a general-purpose central processing unit (CPU), the implementation of simulating biological neural activity through circuit devices and hardware systems allows a large number of parallel computations, has the advantages of high computing speed, low power consumption, etc., and has become an important research direction in the field of neuromorphic technology.

Memristors have the characteristics of high integration, low power consumption, continuous resistance, non-volatility and CMOS process compatibility, etc., and are widely used in neural network circuits. Crossbar arrays constructed by memristors are widely used in multi-layer neural networks, adaptive resonance networks, and convolutional neural networks to achieve weight adjustment of neural networks.

SUMMARY

At least one embodiment of the present disclosure provides a generative adversarial network device, which includes a generator and a discriminator; wherein the generator is configured to generate a first sample according to an input data, the discriminator is coupled to the generator, and is configured to receive the first sample and be trained based on the first sample, and the generator includes a first memristor array as a first weight array.

For example, in the generative adversarial network device provided by some embodiments of the present disclosure, the discriminator is further configured to receive a second sample as a real sample, and be trained based on the second sample.

For example, in the generative adversarial network device provided by some embodiments of the present disclosure, the discriminator includes a second memristor array as a second weight array.

For example, the generative adversarial network device provided by some embodiments of the present disclosure further includes a cost function unit, wherein the cost function unit is configured to obtain a first distance between an actual output result of the discriminator and a target output result of the discriminator according to a discriminator cost function, and is further configured to obtain a second distance between the actual output result of the discriminator and a target output result of the generator according to a generator cost function.

For example, the generative adversarial network device provided by some embodiments of the present disclosure further includes a computing unit, wherein the computing unit is coupled to the cost function unit, and is configured to calculate a gradient of the first sample and a gradient of the second sample according to the first distance obtained by the discriminator cost function, and add the gradient of the first sample and the gradient of the second sample to obtain a first gradient, and is further configured to calculate a gradient of the first sample according to the second distance obtained by the generator cost function as a second gradient.

For example, the generative adversarial network device provided by some embodiments of the present disclosure further includes a weight updating unit, wherein the weight updating unit is coupled to the computing unit, and configured to alternately adjust a group of conductance values of the first memristor array of the generator and a group of conductance values of the second memristor array of the discriminator; the group of conductance values of the second memristor array of the discriminator is adjusted according to the first gradient; and the group of conductance values of the first memristor array of the generator is adjusted according to the second gradient.

For example, in the generative adversarial network device provided by some embodiments of the present disclosure, the weight updating unit is further configured to: obtain a group of initial conductance values of the second memristor array of the discriminator; adjust the group of initial conductance values of the second memristor array of the discriminator based on a sign of the first gradient to obtain a group of adjusted conductance values of the second memristor array of the discriminator; determine whether a direction of change of the group of adjusted conductance values relative to the group of initial conductance values in the second memristor array is consistent with the sign of the first gradient; and if the direction of change of the group of adjusted conductance values relative to the group of initial conductance values in the second memristor array is consistent with the sign of the first gradient or a count of adjustment times of the group of conductance values of the second memristor array reaches a predetermined count of times, stop adjustment of the group of conductance values of the second memristor array in the discriminator, or, if the direction of change of the group of adjusted conductance values relative to the group of initial conductance values in the second memristor array is not consistent with the sign of the first gradient, re-adjust the group of conductance values of the second memristor array based on the sign of the first gradient.

For example, in the generative adversarial network device provided by some embodiments of the present disclosure, the weight updating unit is further configured to: obtain a group of initial conductance values of the first memristor array of the generator; adjust the group of initial conductance values of the first memristor array of the generator based on a sign of the second gradient to obtain a group of adjusted conductance values of the first memristor array of the generator; determine whether a direction of change of the group of adjusted conductance values relative to the group of initial conductance values in the first memristor array is consistent with the sign of the second gradient; and if the direction of change of the group of adjusted conductance values relative to the group of initial conductance values in the first memristor array is consistent with the sign of the second gradient or a count of adjustment times of the group of conductance values of the first memristor array reaches a predetermined count of times, stop adjustment of the group of conductance values of the first memristor array in the generator, or, if the direction of change of the group of adjusted conductance values relative to the group of initial conductance values in the first memristor array is not consistent with the sign of the second gradient, re-adjust the group of conductance values of the first memristor array based on the sign of the second gradient.

For example, the generative adversarial network device provided by some embodiments of the present disclosure further includes a filtering unit, wherein the filtering unit is coupled to the generator and the discriminator, and is configured to filter an output signal of the first memristor array of the generator before the output signal of the first memristor array of the generator is outputted, and to filter an output signal of the second memristor array of the discriminator before the output signal of the second memristor array of the discriminator is outputted.

At least one embodiment of the present disclosure further provides a training method for a generative adversarial network device, wherein the generative adversarial network device includes: a generator, configured to generate a first sample according to an input data, and including a first memristor array as a first weight array; and a discriminator, coupled to the generator, and configured to receive the first sample and be trained based on the first sample; the training method includes: causing the generator to generate the first sample according to the input data; and inputting the first sample into the discriminator and training the discriminator based on the first sample.

For example, the training method provided by some embodiments of the present disclosure further includes: inputting a second sample as a real sample into the discriminator and training the discriminator based on the second sample.

For example, in the training method provided by some embodiments of the present disclosure, the discriminator includes a second memristor array as a second weight array, and the training method further includes: obtaining a first distance between an actual output result of the discriminator and a target output result of the discriminator according to a discriminator cost function; calculating a gradient of the first sample and a gradient of the second sample according to the first distance obtained by the discriminator cost function, and adding the gradient of the first sample and the gradient of the second sample to obtain a first gradient; and adjusting a group of conductance values of the second memristor array of the discriminator according to the first gradient.

For example, in the training method provided by some embodiments of the present disclosure, the adjusting the group of conductance values of the second memristor array of the discriminator according to the first gradient, includes: obtaining a group of initial conductance values of the second memristor array of the discriminator; adjusting the group of initial conductance values of the second memristor array of the discriminator based on a sign of the first gradient to obtain a group of adjusted conductance values of the second memristor array of the discriminator; determining whether a direction of change of the group of adjusted conductance values relative to the group of initial conductance values in the second memristor array is consistent with the sign of the first gradient; and if the direction of change of the group of adjusted conductance values relative to the group of initial conductance values in the second memristor array is consistent with the sign of the first gradient or a count of adjustment times of the group of conductance values of the second memristor array reaches a predetermined count of times, stopping adjustment of the group of conductance values of the second memristor array in the discriminator, or, if the direction of change of the group of adjusted conductance values relative to the group of initial conductance values in the second memristor array is not consistent with the sign of the first gradient, re-adjusting the group of conductance values of the second memristor array of the discriminator based on the sign of the first gradient.

For example, the training method provided by some embodiments of the present disclosure further includes: obtaining a second distance between an actual output result of the discriminator and a target output result of the generator according to a generator cost function; calculating a gradient of the first sample according to the second distance obtained by the generator cost function as a second gradient; and adjusting a group of conductance values of the first memristor array of the generator according to the second gradient.

For example, in the training method provided by some embodiments of the present disclosure, the adjusting the group of conductance values of the first memristor array of the generator according to the second gradient, includes: obtaining a group of initial conductance values of the first memristor array of the generator; adjusting the group of initial conductance values of the first memristor array of the generator based on a sign of the second gradient to obtain a group of adjusted conductance values of the first memristor array of the generator; determining whether a direction of change of the group of adjusted conductance values relative to the group of initial conductance values in the first memristor array is consistent with the sign of the second gradient; and if the direction of change of the group of adjusted conductance values relative to the group of initial conductance values in the first memristor array is consistent with the sign of the second gradient or a count of adjustment times of the group of conductance values of the first memristor array reaches a predetermined count of times, stopping adjustment of the group of conductance values of the first memristor array in the generator, or, if the direction of change of the group of adjusted conductance values relative to the group of initial conductance values in the first memristor array is not consistent with the sign of the second gradient, re-adjusting the group of conductance values of the first memristor array based on the sign of the second gradient.

For example, the training method provided by some embodiments of the present disclosure further includes: filtering an output signal of the first memristor array of the generator before the output signal of the first memristor of the generator is outputted, and filtering an output signal of the second memristor array of the discriminator before the output signal of the second memristor array of the discriminator is outputted.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the present art can obtain other embodiment(s), without any inventive work, which should be within the scope of the disclosure.

Unless otherwise defined, all the technical and scientific terms used herein have the same meanings as commonly understood by one of ordinary skill in the present art to which the present disclosure belongs. The terms "first," "second," etc., which are used in the present disclosure, are not intended to indicate any sequence, amount or importance, but distinguish various components. Also, the terms "a", "an" or "the" etc., are not intended to indicate amount limitation, but indicate that there is at least one. The terms "comprise," "comprising," "include," "including," etc., are intended to specify that the elements or the objects stated before these terms encompass the elements or the objects and equivalents thereof listed after these terms, but do not preclude the other elements or objects. The terms "connect", "connected", etc., are not intended to define a physical connection or mechanical connection, but may include an electrical connection, directly or indirectly. "On," "under," "right," "left", etc., are only used to indicate relative position relationship, and when the position of the object which is described is changed, the relative position relationship may be changed accordingly.

Figure 1:
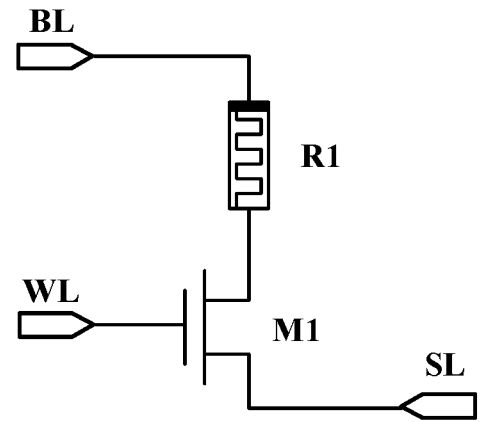
FIG. 1 is a schematic diagram of a memristor unit circuit.

FIG. 1 is a schematic diagram of a memristor unit circuit. As shown in FIG. 1, the memristor unit circuit adopts a 1T1R structure, that is, the memristor unit circuit includes a transistor M1 and a memristor R1.

It should be noted that the transistor adopted in the embodiments of the present disclosure can be a thin film transistor or a field effect transistor (for example, MOS field effect transistor) or other switching device with the same characteristics. The source and drain of the transistor adopted here may be structurally symmetrical, so that the source and the drain may be structurally indistinguishable. In the embodiments of the present disclosure, in order to distinguish the two electrodes of the transistor other than the gate, one of the two electrodes is directly described as a first electrode, and the other is described as a second electrode.

The embodiments of the present disclosure do not limit the type of transistor being adopted. For example, in a case where the transistor M1 adopts an N-type transistor, its gate is connected to a word line terminal WL, for example, the transistor M1 is turned on when the word line terminal WL inputs a high level; the first electrode of the transistor M1 can be a source and configured to be connected to a source line terminal SL, for example, the transistor M1 can receive a reset voltage through the source line terminal SL; the second electrode of the transistor M1 can be a drain and configured to be connected to a second electrode (e.g. negative electrode) of the memristor R1, and the first electrode (e.g. positive electrode) of the memristor is connected to a bit line terminal BL, for example, the memristor R1 can receive a set voltage through the bit line terminal BL. For example, in a case where the transistor M1 adopts a P-type transistor, its gate is connected to a word line terminal WL, for example, the transistor M1 is turned on when the word line terminal WL inputs a low level; the first electrode of the transistor M1 can be a drain and configured to be connected to a source line terminal SL, for example, the transistor M1 can receive a reset voltage through the source line terminal SL; the second electrode of the transistor M1 can be a source and configured to be connected to a second electrode (e.g. negative electrode) of the memristor R1, and the first electrode (e.g. positive electrode) of the memristor R1 is connected to a bit line terminal BL, for example, the memristor can receive a set voltage through the bit line terminal BL. It should be noted that the structure of the resistive memory can also be implemented as other structures, such as a structure in which the second electrode of the memristor R1 is connected to the source line terminal SL, and the embodiments of the present disclosure are not limited to the described cases. Each of the following embodiments is described by taking that the transistor M1 adopts an N-type transistor as an example.

The word line terminal WL is used to apply a corresponding voltage to the gate of the transistor M1, thereby controlling the transistor M1 to be turned on or off. When an operation is performed on the memristor R1, such as a set operation or a reset operation, the transistor M1 needs to be turned on first, that is, it is necessary to apply a turn-on voltage to the gate of the transistor M1 through the word line terminal WL. After the transistor M1 is turned on, for example, a voltage can be applied to the memristor R1 through the source line terminal SL and the bit line terminal BL, so as to change the resistance state of the memristor R1. For example, a set voltage can be applied through the bit line terminal BL, so that the memristor R1 is in a low resistance state; for example, a reset voltage can be applied through the source line terminal SL, so that the memristor R1 is in a high resistance state.

It should be noted that, in the embodiments of the present disclosure, a voltage is applied through the word line terminal WL and the bit line terminal BL simultaneously, so that the resistance value of the memristor R1 becomes smaller and smaller, that is, the memristor R1 changes from a high resistance state to a low resistance state, and the operation of changing the memristor R1 from a high resistance state to a low resistance state is referred to as a set operation; a voltage is applied through the word line terminal WL and the source line terminal SL simultaneously, so that the resistance value of the memristor R1 is larger and larger, that is, the memristor R1 changes from a low resistance state to a high resistance state, and the operation of changing the memristor R1 from a low resistance state to a high resistance state is referred to as a reset operation. The following embodiments follow the same regulations as described herein and details will not be described again.

Figure 2:
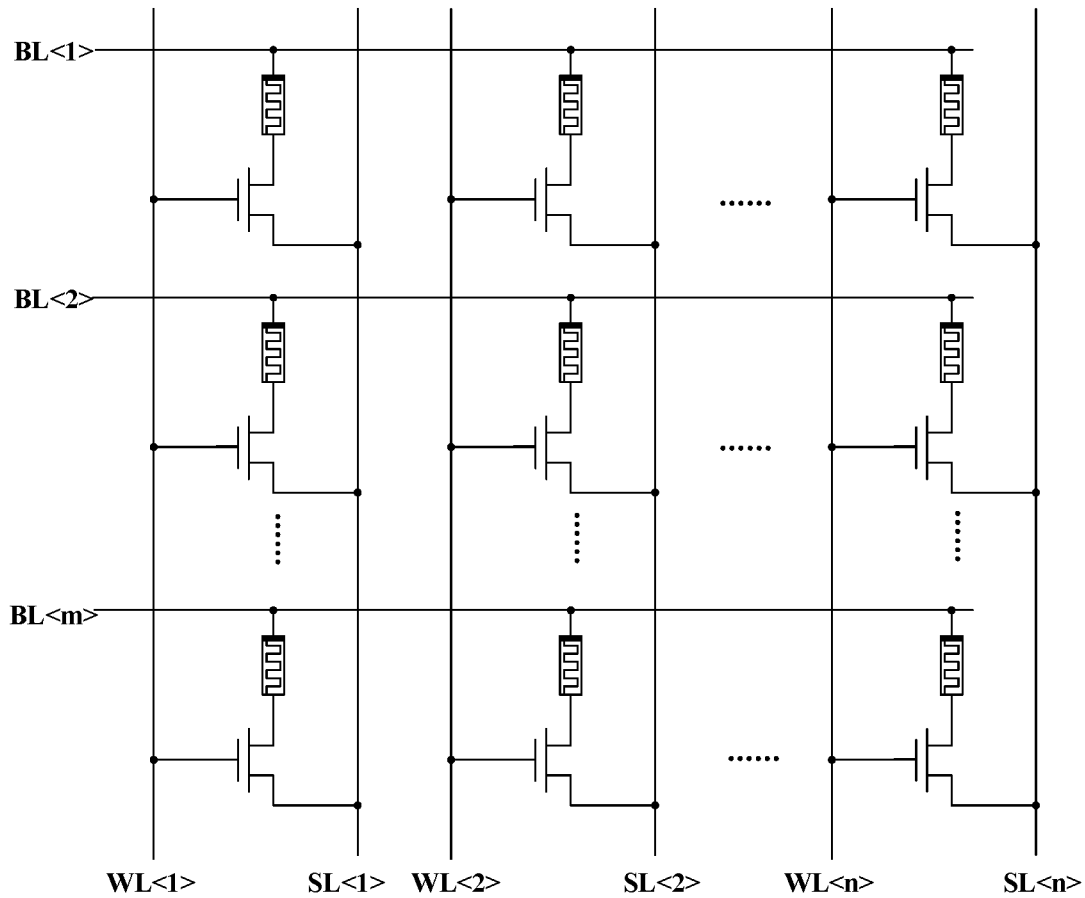
FIG. 2 is a schematic diagram of a memristor array.

FIG. 2 shows a memristor array, and the memristor array is composed of a plurality of memristor unit circuits as shown in FIG. 1. For example, the plurality of memristor unit circuits form an array of m rows and n columns, where m is an integer greater than 1, and n is an integer greater than or equal to 1. BL<1>, BL<2>, . . . , and BL<m> in FIG. 2, represent bit lines of a first row, a second row, . . . , and an mth row, respectively, and the memristors in the memristor unit circuits of each row are connected to a bit line corresponding to the each row; WL<1>, WL<2>, . . . , and WL<n> in FIG. 2, represent word lines of a first column, a second column, . . . , and an nth column, respectively, the gates of the transistors in the memristor unit circuits of each column are connected to a word line corresponding to the each column; SL<1>, SL<2>, . . . , and SL<n> in FIG. 2, represent source lines of the first column, the second column, . . . , and the nth column, respectively, the sources of the transistors in the memristor unit circuits of each column are connected to a source line corresponding to the each column.

The memristor array of m rows and n columns shown in FIG. 2 can represent a neural network weight matrix of m rows and n columns. For example, a first layer of neuron layers has m neuron nodes, which are connected to the m rows of bit lines of the memristor array shown in FIG. 2; a second layer of neuron layers has n neuron nodes, which are connected to the n columns of source lines of the memristor array shown in FIG. 2. By inputting voltage excitations in parallel to the first layer of neuron layers, output currents obtained by multiplying the voltage excitation vector and the conductance (a conductance is the reciprocal of a resistance) matrix of the memristor array can be obtained in the second layer of neuron layers.

Specifically, according to Kirchhoff's law, the output currents of the memristor array can be derived from the following formula:

$$i_j = \Sigma_{k=1}^{m}(v_k g_{k,j})$$

where j=1, . . . , n, and k=1, . . . , m.

In the above formula, $v_k$ represents a voltage excitation input to a neuron node k of the first layer of neuron layers, $i_j$ represents an output current of a neuron node j of the second layer of neuron layers, and $g_{kj}$ represents the conductance matrix of the memristor array.

It should be noted that, for example, in some examples, each weight of the neural network weight matrix can also be implemented by using two memristors. That is to say, outputting an output current corresponding to one column can be implemented by using two columns of memristors in the memristor array. In this case, memristor array of m rows and 2n columns is required to represent a neural network weight matrix of m rows and n columns.

It should be noted that, the current outputted by the memristor array is an analog current. In some examples, the analog current can be converted to a digital voltage by an analog-to-digital conversion circuit (ADC) and transferred to the second layer of neuron layers, so that the second layer of neuron layers can also be connected to another layer of neuron layers through another memristor array.

A generative adversarial network (GAN) is a deep learning model in the field of neuromorphic technology, and can be applied to some important fields, such as computer vision, natural language processing, semi-supervised learning, etc. Based on the zero-sum game in game theory, the GAN regards a generation problem as the confrontation and game between two modules, that is, a discriminator (also referred to as discriminator network) and a generator (also referred to as generator network). The generator generates a fake sample based on a given input data (for example, noise sequence), and the discriminator distinguishes the fake sample and a real sample. The generator attempts to generate a fake sample closer to reality, and in turn, the discriminator attempts to distinguish the real sample and the fake sample more accurately. As a result, the two modules progress in confrontation and continue to confront after progress. And the fake sample generated by the generator is also getting closer to the real sample, so that the GAN can obtain a desired realistic fake sample. For example, the sample can include a picture, a video, a text sequence, etc.

However, during training the GAN, on the one hand, when there is only little overlap or even no overlap between the fake sample and the real sample, the GAN faces the problem of vanishing gradient; on the other hand, the GAN also faces the problem of mode collapse that leads to a lack of diversity for the generated sample. In order to solve these two problems, it is usually necessary to add noise (for example, pseudo-random noise) to the fake sample generated by the generator during training the GAN. However, on the one hand, the process of adding noise increases the training time and resource consumption of the generative adversarial network, thereby reducing the training efficiency of the GAN; on the other hand, the added noise is pseudo-random noise, so that the generative adversarial network may not achieve a good training effect.

At least one embodiment of the present disclosure provides a generative adversarial network device, which includes a generator and a discriminator. The generator is configured to generate a first sample according to an input data; the discriminator is coupled to the generator, and is configured to receive the first sample and be trained based on the first sample; and the generator includes a first memristor array as a first weight array.

At least one embodiment of the present disclosure also provides a training method corresponding to the above generative adversarial network device.

The generative adversarial network device and the training method thereof provided by the embodiments of the present disclosure, by using the natural intrinsic noise of the memristor array, can overcome the above problems of the generative adversarial network, omit the process of adding noise to the fake sample generated by the generator, thereby saving training time, reducing resource consumption, and improving the training speed of the generative adversarial network.

The embodiments of the present disclosure will be described in detail below with reference to the accompanying drawings.

Figure 3:
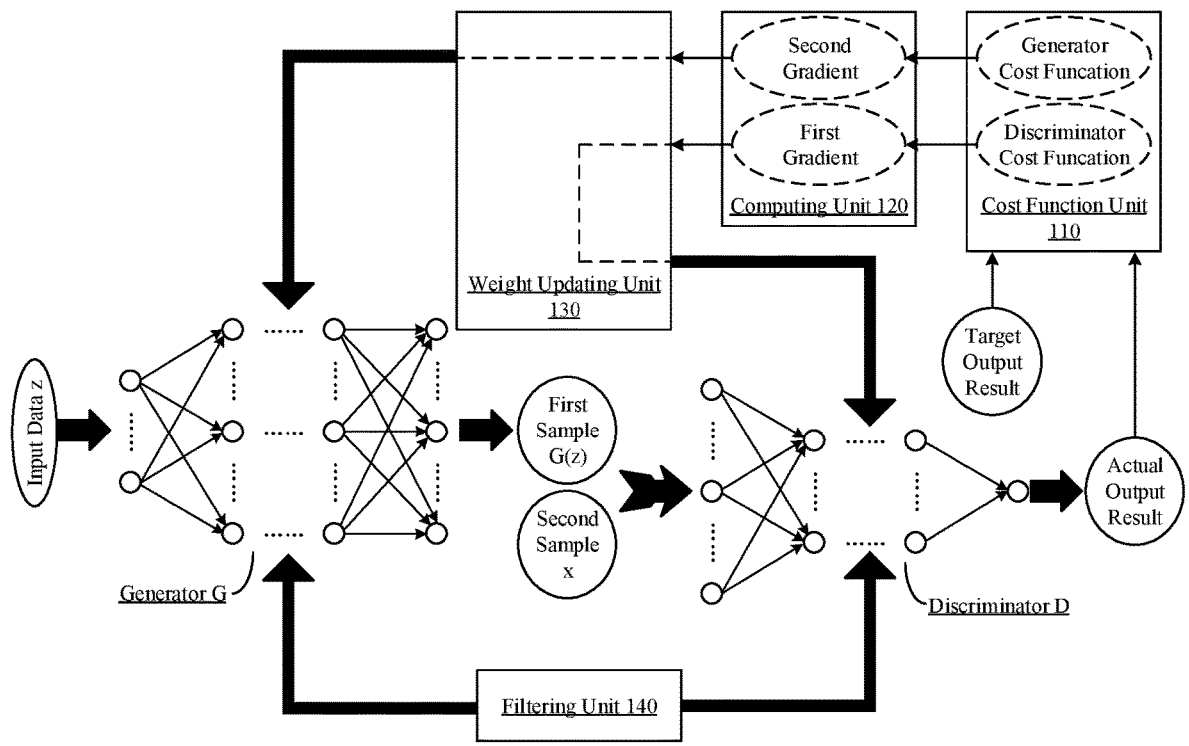
FIG. 3 is a schematic structural diagram of a generative adversarial network device provided by an embodiment of the present disclosure.

FIG. 3 shows a schematic structural diagram of a generative adversarial network device. As shown in FIG. 3, the generative adversarial network device 100 includes a generator G and a discriminator D. For example, the generative adversarial network device 100 can be used to generate objects such as numbers, faces, etc. For example, the generative adversarial network device 100 can also be used to construct various realistic indoor and outdoor scenes, to recover original images from segmented images, to color black and white images, to recover object images from object outlines and to generate high-resolution images from low-resolution images, etc. In addition, the generative adversarial network can also be applied to various aspects such as voice and language processing, computer virus monitoring, and chess game programs, etc.

For example, the generator G is configured to generate a first sample G(z) according to an input data z. For example, the first sample is a fake sample as described above. For example, the generator G includes a first memristor array as a first weight array. For example, the first memristor array can be implemented by the memristor array shown in FIG. 2. For example, the input data may be data sampled in a data distribution such as a Gaussian distribution or a uniform distribution, etc.

For example, the discriminator D is coupled to the generator and is configured to receive the first sample G(z) and be trained based on the first sample G(z).

Figure 4:
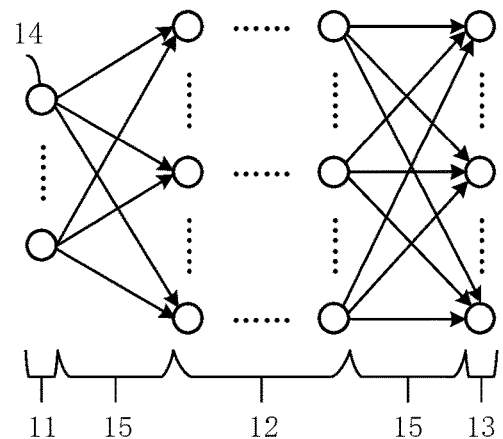
FIG. 4 is a schematic structural diagram of a generator G including a memristor array provided by an embodiment of the present disclosure.

For example, a specific structure of the generator G is as shown in FIG. 4. The generator G includes N (N is an integer greater than or equal to 3) layers of neuron layers connected one by one and a first memristor array connecting any two adjacent layers of the neuron layers.

For example, as shown in FIG. 4, in the generator N layers of neuron layers connected one by one includes an input layer 11, at least one hidden layer 12 and an output layer 13. For example, the input layer 11 includes a first layer of neuron layers, the at least one hidden layer 12 includes a second layer to an (N−1)th layer of neuron layers, and the output layer 13 includes an Nth layer of neuron layers. For example, referring to FIG. 3 and FIG. 4, the input layer 11 receives an input data z, the input data z is forwardly propagated to the output layer 13 via the at least one hidden layer 12, and the output layer 13 outputs a first sample G(z). For example, as shown in FIG. 4, the layers of the generator G may be fully connected; for example, in some other examples, the layers of the generator G may not be fully connected, for example, the generator G can be a conventional neural network in the present art such as a convolutional neural network, etc., and the embodiments of the present disclosure are not limited to the described cases. For example, as shown in FIG. 4, the input layer 11, the at least one hidden layer 12 and the output layer 13 each may include a plurality of neurons 14, the number of neurons 14 in each layer may be set according to different application scenarios. For example, when there are M (M is an integer greater than 1) input data, the input layer 11 has M neurons 14.

For example, as shown in FIG. 4, any two adjacent layers of the neuron layers of the generator G are connected via a synaptic weight network 15. For example, the hidden layer 12 also includes a synaptic weight network (not shown in FIG. 4). For example, the synaptic weight network is implemented by the memristor array shown in FIG. 2. For example, in some examples, the generator G further includes a sample-and-hold circuit (not shown) that converts an analog current outputted by the first memristor array 15 into an analog voltage before transferring. For example, in some examples, the generator G further includes an analog to digital conversion circuit (not shown in FIG. 4) that converts the analog current outputted by the first memristor array 15 into a digital voltage before transferring.

It should be noted that, due to intrinsic read and write noise of the memristor itself, the first sample G(z) generated by the generator G itself carries random noise and can be directly inputted into the discriminator D without additionally adding noise to each generated sample G(z) one by one, thereby reducing training time, reducing resource consumption, and improving the training speed of the generative adversarial network.

For example, in at least one embodiment of the present disclosure, as shown in FIG. 3, the discriminator D is further configured to receive a second sample x as a real sample, and be trained based on the second sample x. For example, the discriminator D, as a classification network, may classify the real and fake samples based on the first sample as the fake sample and the second sample as the real sample.

For example, in at least one embodiment of the present disclosure, the discriminator D includes a second memristor array as a second weight array. It should be noted that, the discriminator may also be implemented as other types of neural networks in the present art, for example, implemented as a software-implemented neural network (for example, implemented by a processor and a memory), and details are not repeatedly described herein, and the embodiments of the present disclosure are not limited to the described cases.

Figure 5:
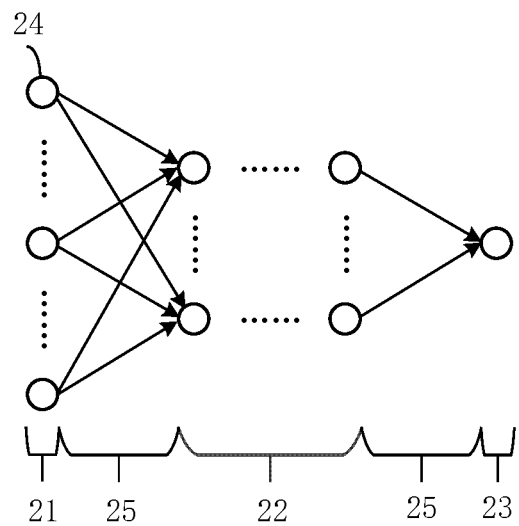
FIG. 5 is a schematic structural diagram of a discriminator D including a memristor array provided by an embodiment of the present disclosure.

For example, a specific structure of the discriminator D is as shown in FIG. 5. The discriminator D includes A (A is an integer greater than or equal to 3) layers of neuron layers connected one by one and a second memristor array connecting any two adjacent layers of the neuron layers.

For example, as shown in FIG. 5, in the discriminator D, A layers of neuron layers connected one by one includes an input layer 21, at least one hidden layer 22 and an output layer 23. For example, the input layer 21 includes a first layer of neuron layers, the at least one hidden layer 22 includes a second layer to an (A−1)th layer of neuron layers, and the output layer 23 includes an Ath layer of neuron layers. For example, referring to FIG. 3 and FIG. 5, the input layer 21 receives data of the first sample G(z) and data of the second sample x, the data of the first sample G(z) and the data of the second sample x is forwardly propagated to the output layer 23 via the at least one hidden layer 22, and the output layer 23 outputs an actual output result of the discriminator D. For example, as shown in FIG. 5, the layers of the discriminator D may be fully connected; for example, in some other examples, the layers of the discriminator D may not be fully connected, for example, the discriminator D can be a convolutional neural network. For example, as shown in FIG. 5, the input layer 21 and the at least one hidden layer 22 each may include a plurality of neurons 24, and the number of neurons 24 of the at least one hidden layer 22 may be set according to different application scenarios. For example, as shown in FIG. 5, the output layer 23 may include at least one neuron 24 for outputting actual output results corresponding to the first sample G(z) and the second sample x.

For example, as shown in FIG. 5, any two adjacent layers of the neuron layers of the discriminator D can be connected via a synaptic weight network 25. For example, the hidden layer 22 also includes a synaptic weight network (not shown in FIG. 5). For example, the synaptic weight network is implemented by the memristor array shown in FIG. 2. For example, in some examples, the discriminator D further includes a sample-and-hold circuit (not shown) that converts an analog current outputted by the second memristor array 25 into an analog voltage before transferring. For example, in some examples, the discriminator D further includes an analog to digital conversion circuit (not shown in FIG. 5) that converts the analog current outputted by the second memristor array 25 into a digital voltage before transferring.

Figure 6:
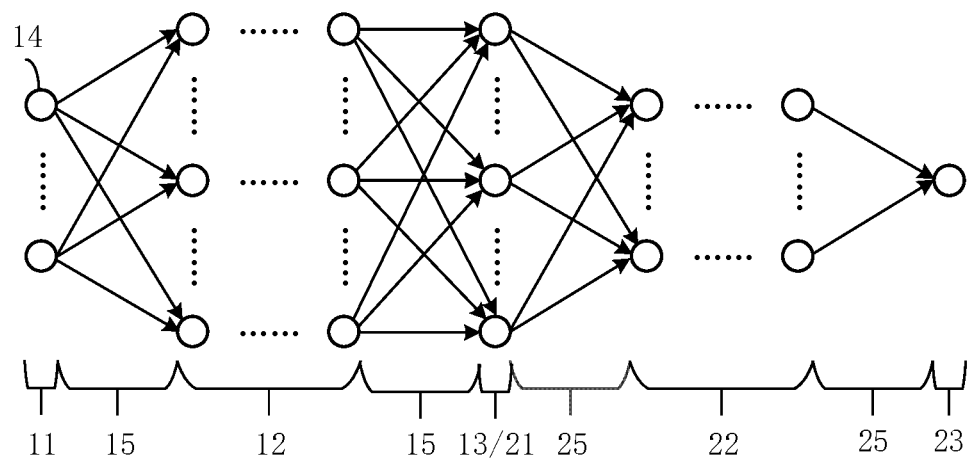
FIG. 6 is a schematic structural diagram of a generative adversarial network including memristor arrays provided by an embodiment of the present disclosure.

It should be noted that, because data dimension of the first sample G(z) generated by the generator G should be the same as data dimension of the second sample x, the number of neurons 14 of the output layer 13 of the generator G depends on the data dimension of the real sample x. For example, when the second sample x includes r*s data, the output layer 13 accordingly includes r*s neurons 14, where at least one of r and s is an integer greater than 1. In addition, because the discriminator D receives the first sample G(z) and the second sample x, the number of neurons 24 of the input layer 21 of the discriminator D depends on the data dimension of the first sample G(z) and the data dimension of the real sample x, i.e., the number of neurons 24 of the input layer 21 is the same as the number of neurons 14 of the output layer 13 of the generator G For example, in some examples, as shown in FIG. 6, the output layer 13 of the generator G can be directly used as the input layer 21 of the discriminator D. In this case, the generator G and the discriminator D are coupled as a neural network, the input layer 11 serves as an input layer of the neural network, the output layer 23 serves as an output layer of the neural network, and the remaining layers serve as hidden layers of the neural network.

For example, in at least one embodiment of the present disclosure, as shown in FIG. 3, the generative adversarial network device 100 further includes a cost function unit 110. For example, the cost function unit 110 can be implemented by, for example, hardware, software, firmware, or any combination thereof. The cost function unit 110 is configured to obtain a first distance between an actual output result of the discriminator D and a target output result of the discriminator D according to a discriminator cost function, and is further configured to obtain a second distance between the actual output result of the discriminator D and a target output result of the generator G according to a generator cost function.

For example, in some examples, the cost function of the generative adversarial network model is as follows:

$$\min_G \max_D L(D, G) = E_{x \sim p_2(x)}[\log D(x)] + E_{z \sim p_1(z)}[\log(1 - D(G(x)))]$$

In the above formula, D(x) represents an actual output result of the discriminator D corresponding to the second sample x, D(G(z)) represents an actual output of the discriminator D corresponding to the first sample G(z), $p_2(x)$ represents a distribution of the second sample, $p_1(z)$ represents a distribution of the first sample, and E represents an mathematical expectation.

For example, in the generative adversarial network model, an objective of training the discriminator D is to cause the discriminator D to correctly classify the training samples (the generated sample G(z) and the real sample x) with maximum probability, that is, to maximize log D(x) and log(1−D(G(z))); if the cost function of the discriminator D is considered as −log D(x)−log(1−D(G(z))), the objective of training the discriminator D is to minimize this cost function. An objective of training the generator G is to minimize log(1−D(G(Z))), i.e., the cost function of the generator G can be considered as log (1−D(G(Z))).

For example, during training the discriminator D, the first sample G(z) and the second sample x are inputted to the discriminator D to obtain actual output results of the discriminator D. For example, an actual output result of discriminator D is a probability value, for example, between 0-1. For example, during training the discriminator D, the target output result of the first sample G(z) is 0, and the target output of the second sample x is 1, so that the first distance between the actual output result of the discriminator D and the target output result of the discriminator D can be obtained according to the above discriminator cost function.

For example, during training the generator the first sample G(z) is inputted as a sample to be distinguished to the discriminator D to obtain an actual output result of the discriminator D. For example, during training the generator the target output result of the first sample G(z) is 1, so that the second distance between the actual output result of the discriminator D and the target output result of the generator G can be obtained according to the above generator cost function.

For example, in at least one embodiment of the present disclosure, as shown in FIG. 3, the generative adversarial network device 100 further includes a computing unit 120. For example, the computing unit 120 can be implemented by, for example, hardware, software, firmware, or any combination thereof.

For example, the computing unit 120 is coupled to the cost function unit 110, and configured to calculate a gradient of the first sample G(z) and a gradient of the second sample x according to the first distance obtained by the discriminator cost function, and add the gradient of the first sample G(z) and the gradient of the second sample x to obtain a first gradient; and is further configured to calculate a gradient of the first sample G(z) according to the second distance obtained by the generator cost function as a second gradient. For example, the computing unit 120 can calculate gradient based on an algorithm such as back propagation, etc.

For example, during training the discriminator, a weight parameter of the discriminator D (i.e., a conductance value of the second memristor array) is updated based on the first gradient; during training the generator, a weight parameter of the generator G (i.e., a conductance value of the first memristor array) is updated based on the second gradient. The weight of the discriminator is updated based on the first gradient, a sum of the gradient corresponding to the real sample and the gradient corresponding to the fake sample, so that the number of times of updating the weight of the discriminator can be reduced to 1 time from the original 2 times (for example, updating one time based on the gradient of the first sample and then updating another time based on the gradient of the second sample), thereby reducing the negative effects generated by the write noise during training the discriminator.

For example, in at least one embodiment of the present disclosure, as shown in FIG. 3, the generative adversarial network device 100 further includes a weight updating unit 130. For example, the weight updating unit 130 can be implemented by, for example, hardware, software, firmware, or any combination thereof.

For example, the weight updating unit 130 is coupled to the computing unit 120, and configured to alternately adjust a group of conductance values of the first memristor array 15 of the generator G and a group of conductance values of the second memristor array 25 of the discriminator D. For example, the group of conductance values of the second memristor array 25 of the discriminator D is adjusted according to the above first gradient; and the group of conductance values of the first memristor array 15 of the generator G is adjusted according to the above second gradient.

It should be noted that, because the generator G and the discriminator D are two mutually adversarial and relatively independent neural networks, the generator G and the discriminator D can be alternately trained in a training process, that is, maintaining the weight values of one of the two networks (e.g., generator) unchanged while training the other of the two networks (e.g., discriminator) and updating the weight values of the other of the networks (i.e., the conductance value of the memristor array) to minimize the cost function corresponding to the other of the networks, until Nash equilibrium of the two networks is reached. Thus, during training the discriminator D, the group of conductance values of the first memristor array 15 of the generator G is maintained unchanged, and only the group of conductance values of the second memristor array 25 of the discriminator D is adjusted according to the above first gradient; during training the generator the group of conductance values of the second memristor array 25 of the discriminator D is maintained unchanged, and only the group of conductance values of the first memristor array 15 of the generator G is adjusted according to the above second gradient.

Figure 7:
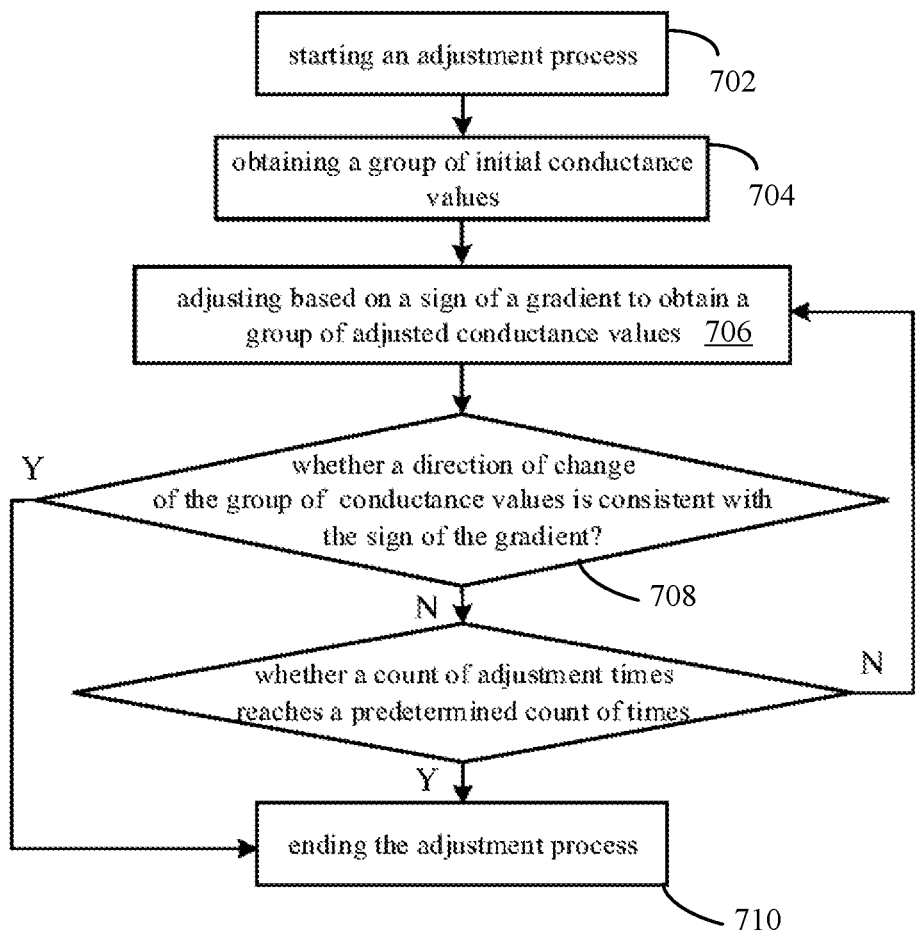
FIG. 7 is a schematic flowchart of adjusting a conductance value of a memristor array provided by an embodiment of the present disclosure.

For example, in at least one embodiment of the present disclosure, the weight updating unit 130, at 702, is further configured to adjust the group of conductance values of the first memristor array 15 or/and the group of conductance values of the second memristor array 25 according to the flowchart shown in FIG. 7.

For example, in some examples, during training the discriminator D, with reference to FIG. 7, the weight updating unit 130 is further configured to: obtain a group of initial conductance values of the second memristor array 25 of the discriminator D at 704; adjust the group of initial conductance values of the second memristor array 25 of the discriminator D based on a sign of the first gradient to obtain a group of adjusted conductance values of the second memristor array 25 of the discriminator at 706; determine whether a direction of change of the group of adjusted conductance values relative to the initial conductance values in the second memristor array 25 is consistent with the sign of the first gradient at 708; and if the direction of change of the group of adjusted conductance values relative to the group of initial conductance values in the second memristor array is consistent with the sign of the first gradient or a count of adjustment times of the group of conductance values of the second memristor array 25 reaches a predetermined count of times, stop adjustment of the group of conductance values of the second memristor array 25 in the discriminator D at 710; or, if the direction of change of the group of adjusted conductance values relative to the group of initial conductance values in the second memristor array is not consistent with the sign of the first gradient, re-adjust the group of conductance values of the second memristor array 25 based on the sign of the first gradient at 706.

For example, the group of conductance values of the second memristor array 25 can be adjusted by applying a plurality of set or reset operations to the memristors in the second memristor array 25. For example, if a certain sign of the first gradient is positive, a set operation is performed on a corresponding memristor to increase the conductance value of the memristor (to reduce the resistance value of the memristor); if a certain sign of the first gradient is negative, a reset operation is performed on a corresponding memristor to reduce the conductance value of the memristor (to increase the resistance value of the memristor).

For example, in some examples, during training the generator with reference to FIG. 7, the weight updating unit 130 is further configured to: obtain a group of initial conductance values of the first memristor array 15 of the generator G; adjust the group of initial conductance values of the first memristor array 15 of the generator G based on a sign of the second gradient to obtain a group of adjusted conductance values of the first memristor array 15 of the generator G; determine whether a direction of change of the group of adjusted conductance values relative to the group of initial conductance values in the first memristor array 15 is consistent with the sign of the second gradient; if the direction of change of the group of adjusted conductance values relative to the group of initial conductance values in the first memristor array is consistent with the sign of the second gradient or a count of adjustment times of the group of conductance values of the first memristor array 15 reaches a predetermined count of times, stop adjustment of the group of conductance values of the first memristor array in the generator G; or, if the direction of change of the group of adjusted conductance values relative to the group of initial conductance values in the first memristor array is not consistent with the sign of the second gradient, re-adjust the group of conductance values of the first memristor array 15 based on the sign of the second gradient.

For example, the group of conductance values of the first memristor array 15 can be adjusted by applying a plurality of set or reset operations to the memristors in the first memristor array 15. For example, if a certain sign of the second gradient is positive, a set operation is performed on a corresponding memristor to increase the conductance value of the memristor (to reduce the resistance value of the memristor); if a certain sign of the second gradient is negative, a reset operation is performed on a corresponding memristor to reduce the memristor conductance value of the memristor (to increase the resistance value of the memristor).

For example, in at least one embodiment of the present disclosure, as shown in FIG. 3, the generative adversarial network device 100 further includes a filtering unit 140. For example, the filtering unit 140 is coupled to the generator G and the discriminator D. For example, the filtering unit 140 can filter output signals of one or more layers of the hidden layer in the middle to reduce the influence of the read and write noise of the memristors on the output signals of the generator G and the discriminator D. For example, the filtering unit 140 can be implemented by, for example, hardware, software, firmware, or any combination thereof.

For example, the filtering unit 140 is configured to filter an output signal of the second memristor array 25 of the discriminator D before the output signal of the second memristor array 25 of the discriminator D is outputted, and/or to filter an output signal of the first memristor array 15 of the generator G before the output signal of the first memristor array 15 of the generator G is outputted. For example, the filtering unit 140 can filter the output signal of the second memristor array 25 of the discriminator D and the output signal of the first memristor 15 array of the generator G by means of spatial filtering or/and temporal filtering, specific filtering manners can be referred to conventional filtering methods and techniques in the present art, and the present disclosure is not limited to the described cases. It should be noted that, due to intrinsic read and write noise of the memristors in the second memristor array 25 of the discriminator D, during training the generative adversarial network, the filtering unit 140 can be used to filter the output signal of the second memristor array 25 of the discriminator D. For example, in some examples, the filtering unit 140 may filter the output signal of the hidden layer 22 of the discriminator D.

It should be noted that, the components and structures of the generative adversarial network device shown in FIG. 3 are merely exemplary and not restrictive, and the specific structures and implementations of the foregoing units can adopt various existing feasible solutions as needed, but are not limited thereto. It should also be noted that, the embodiments of the present disclosure do not provide the whole structures of the generative adversarial network device, and in order to realize the function of the generative adversarial network device, those skilled in the art can understand that the generative adversarial network device may also include other necessary structures, units or modules, and the embodiments of the present disclosure are not limited to the described cases.

Figure 8:
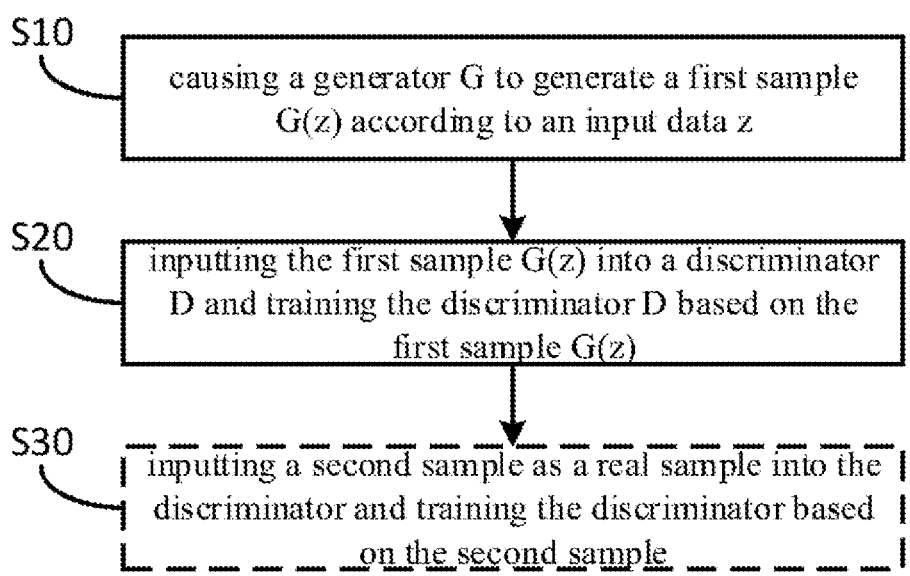
FIG. 8 is a flowchart of a training method provided by an embodiment of the present disclosure.

At least one embodiment of the present disclosure also provides a training method, which can be used for training the generative adversarial network device provided by the embodiments of the present disclosure. For example, as shown in FIG. 8, in some examples, the training method can include step S10 to step S20; in some other examples, the training method can further include step S30. Hereinafter, the training method provided by at least one embodiment of the present disclosure will be described with reference to FIG. 8.

Step S10: causing a generator G to generate a first sample G(z) according to an input data z;

Step S20: inputting the first sample G(z) into a discriminator D and training the discriminator D based on the first sample G(z).

For step S10, for example, the first sample can be generated according to the input data by using the generator shown in FIG. 4. For example, the first sample is a fake sample. For example, the input data may be data sampled in a data distribution such as a Gaussian distribution or a uniform distribution. A specific implementation process of step S10 can be referred to the related description of generator G shown in FIG. 4, and details are not repeatedly described herein.

For step S20, for example, the discriminator is coupled to the generator, and configured to receive the first sample, and be trained based on the first sample. For example, the discriminator may adopt the neural network architecture shown in FIG. 5, and details are not repeatedly described herein.

For example, a specific training process of the discriminator will be described in detail below, and details are not repeatedly described herein.

In some embodiments of the present disclosure, as shown in FIG. 8, the above training method can further include step S30: inputting a second sample x as a real sample into the discriminator D and training the discriminator D based on the second sample. For example, the discriminator is further configured to receive the second sample as a real sample and be trained based on the second sample. For example, because the discriminator is a classification network, a classification training can be performed on the discriminator based on the first sample and the second sample.

Figure 9:
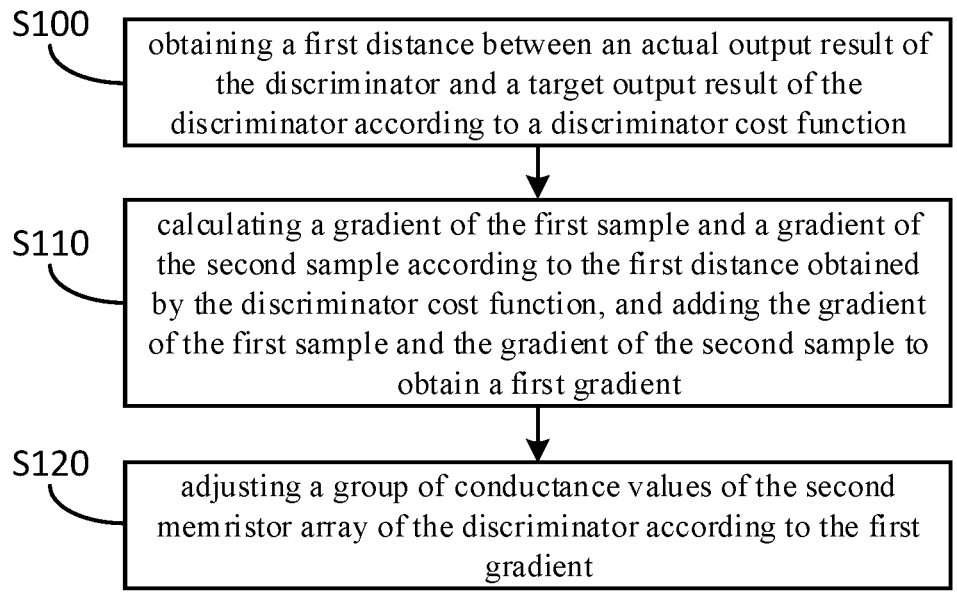
FIG. 9 is a flowchart of training a discriminator provided by an embodiment of the present disclosure.

For example, in some embodiments, the discriminator D includes a second memristor array 25 as a second weight array. FIG. 9 is a flowchart of training a discriminator provided by an embodiment of the present disclosure. As shown in FIG. 9, the method for training the discriminator includes step S100 to step S120.

Step S100: obtaining a first distance between an actual output result of the discriminator D and a target output result of the discriminator D according to a discriminator cost function.

For example, in some examples, the cost function unit 110 shown in FIG. 3 can be utilized to obtain the first distance between the actual output result of the discriminator D and the target output result of the discriminator D based on the first sample G(z) and the second sample x according to the foregoing discriminator cost function. For example, a detailed description may be referred to the related description of the cost function unit 110 shown in FIG. 3, and details are not repeatedly described herein.

Step S110: calculating a gradient of the first sample G(z) and a gradient of the second sample x according to the first distance obtained by the discriminator cost function, and adding the gradient of the first sample G(z) and the gradient of the second sample x to obtain a first gradient.

For example, in some examples, the computing unit 120 shown in FIG. 3 can be utilized to calculate the gradient of the first sample G(z) and the gradient of the second sample x, and add the gradient of the first sample G(z) and the gradient of the second sample x to obtain the first gradient. For example, a detailed description may be referred to the related description of the computing unit 120 shown in FIG. 3, and details are not repeatedly described herein.

Step S120: adjusting a group of conductance values of the second memristor array 25 of the discriminator D according to the first gradient.

For example, in some examples, the weight updating unit 130 shown in FIG. 3 can be utilized to adjust the group of conductance values of the second memristor array 25 of the discriminator D.

For example, in some examples, with reference to FIG. 7, step S120 may include the following steps: obtaining a group of initial conductance values of the second memristor array 25 of the discriminator D; adjusting the group of initial conductance values of the second memristor array 25 of the discriminator D based on a sign of the first gradient to obtain a group of adjusted conductance values of the second memristor array 25 of the discriminator D; determining whether a direction of change of the group of adjusted conductance values relative to the group of initial conductance values in the second memristor array 25 is consistent with the sign of the first gradient; and if the direction of change of the group of adjusted conductance values relative to the group of initial conductance values in the second memristor array is consistent with the sign of the first gradient or a count of adjustment times of the group of conductance values of the second memristor array 25 reaches a predetermined count of times, stopping adjustment of the group of conductance values of the second memristor array 25 in the discriminator D; or, if the direction of change of the group of adjusted conductance values relative to the group of initial conductance values in the second memristor array is not consistent with the sign of the first gradient, re-adjusting the group of conductance values of the second memristor array 25 based on the sign of the first gradient. For example, the group of conductance values of the second memristor array 25 can be adjusted by applying a plurality of set or reset operations to the memristors in the second memristor array 25.

For example, adjusting the group of initial conductance values of the second memristor array 25 of the discriminator D based on the sign of the first gradient to obtain the group of adjusted conductance values of the second memristor array 25 of the discriminator D, can include: if a certain sign of the first gradient is positive, a set operation is performed on a corresponding memristor to increase the conductance value of the memristor (to reduce the resistance value of the memristor); if a certain sign of the first gradient is negative, a reset operation is performed on a corresponding memristor to reduce the conductance value of the memristor (to increase the resistance value of the memristor).

Figure 10:
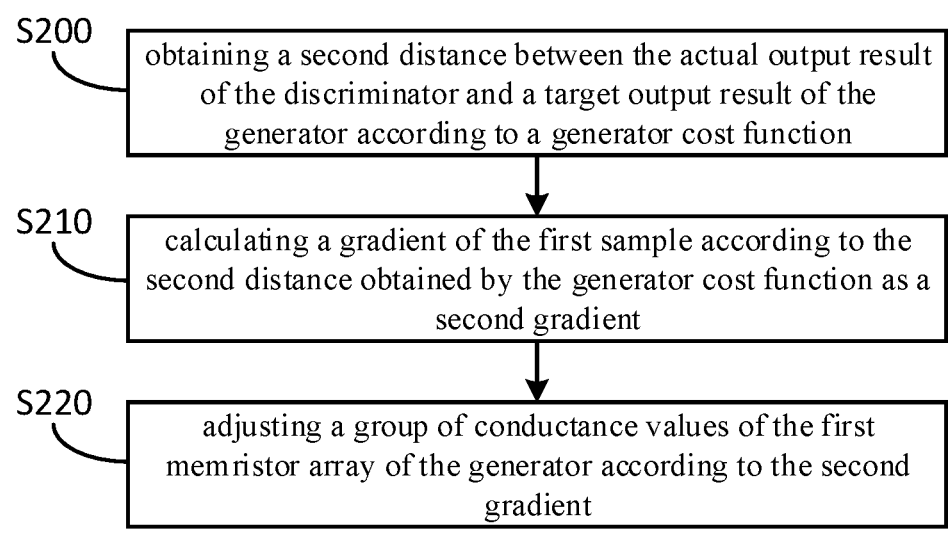
FIG. 10 is a flowchart of training a generator provided by an embodiment of the present disclosure.

FIG. 10 is a flowchart of training a generator provided by an embodiment of the present disclosure. For example, as shown in FIG. 10, in some embodiments, the method for training the generator includes step S200 to step S220.

Step S200: obtaining a second distance between the actual output result of the discriminator D and a target output result of the generator G according to a generator cost function.

For example, in some examples, the cost function unit 110 shown in FIG. 3 can be utilized to obtain the second distance between the actual output result of the discriminator D and the target output result of the generator G based on the first sample G(z) according to the above generator cost function. For example, a detailed description may be referred to the related description of the cost function unit 110 shown in FIG. 3, and details are not repeatedly described herein.

Step S210: calculating a gradient of the first sample G(z) according to the second distance obtained by the generator cost function as a second gradient.

For example, in some examples, the computing unit 120 shown in FIG. 3 can be utilized to calculate the gradient of the first sample G(z) as the second gradient. For example, a detailed description may be referred to the related description of the computing unit 120 shown in FIG. 3, and details are not repeatedly described herein.

Step S220: adjusting a group of conductance values of the first memristor array 15 of the generator G according to the second gradient.

For example, in some examples, the weight updating unit 130 shown in FIG. 3 can be utilized to adjust the group of conductance values of the first memristor array 15 of the generator G For example, a detailed description may be referred to the related description of the weight updating unit 130 shown in FIG. 3, and details are not repeatedly described herein.

For example, in some examples, with reference to FIG. 7, step S220 may include the following steps: obtaining a group of initial conductance values of the first memristor array 15 of the generator G; adjusting the group of initial conductance values of the first memristor array 15 of the generator G based on a sign of the second gradient to obtain a group of adjusted conductance values of the first memristor array 15 of the generator G; determining whether a direction of change of the group of adjusted conductance values relative to the group of initial conductance values in the first memristor array 15 is consistent with the sign of the second gradient; and if the direction of change of the group of adjusted conductance values relative to the group of initial conductance values in the first memristor array 15 is consistent with the sign of the second gradient or a count of adjustment times of the group of conductance values of the first memristor array 15 reaches a predetermined count of times, stopping adjustment of the group of conductance values of the first memristor array 15 in the generator G; if the direction of change of the group of adjusted conductance values relative to the group of initial conductance values in the first memristor array 15 is not consistent with the sign of the second gradient, re-adjusting the group of conductance values of the first memristor array 15 based on the sign of the second gradient. For example, the group of conductance values of the first memristor array 15 can be adjusted by applying a plurality of set or reset operations to the memristors in the first memristor array 15.

For example, adjusting the group of initial conductance values of the first memristor array 15 of the generator G based on the sign of the second gradient to obtain the group of adjusted conductance values of the first memristor array 15 of the generator can include: if a certain sign of the second gradient is positive, a set operation is performed on a corresponding memristor to increase the conductance value of the memristor (to reduce the resistance value of the memristor); if a certain sign of the second gradient is negative, a reset operation is performed on a corresponding memristor to reduce the conductance value of the memristor (to increase the resistance value of the memristor).

For example, in some embodiments, the above training method can further include: filtering an output signal of the second memristor array 25 of the discriminator D before the output signal of the second memristor array 25 of the discriminator D is outputted, and/or filtering an output signal of the first memristor array 15 of the generator G before the output signal of the first memristor array 15 of the generator G is outputted. For example, in some examples, the filtering unit 140 shown in FIG. 3 can be utilized to filter the output signal of the second memristor array 25 of the discriminator D and the output signal of the first memristor array 15 of the generator G For example, a detailed description may be referred to the related description of the filtering unit 140 shown in FIG. 3, and details are not repeatedly described herein.

It should be noted that, in the embodiments of the present disclosure, the flow of the training method may include more or fewer operations, which may be performed sequentially or in parallel. While the flow of the above training method includes a plurality of operations occurring in a specific order, it should be clearly understood that the order of the plurality of operations is not limited. The above training method can be performed once or multiple times according to predetermined conditions.

It should be noted that, a detailed description and technical effects of the training method provided by the embodiments of the present disclosure can be referred to the description of working principle of the generative adversarial network device provided by the embodiments of the present disclosure, and details are not repeatedly described herein.

The foregoing is merely specific embodiments of the present disclosure, but the scope of protection of the present disclosure is not limited thereto. The scope of protection of the present disclosure should be defined by the scope of the claims.

What is claimed is:

1. A generative adversarial network device, comprising:
a generator, a discriminator, a cost function unit and a computing unit; wherein
the generator is configured to generate a first sample according to an input data, the discriminator is coupled to the generator, and is configured to receive the first sample and be trained based on the first sample, the discriminator is further configured to receive a second sample as a real sample, and be trained based on the second sample, the generator comprises a first memristor array as a first weight array, the discriminator comprises a second memristor array as a second weight array, the cost function unit is configured to obtain a first distance between an actual output result of the discriminator and a target output result of the discriminator according to a discriminator cost function, and is further configured to obtain a second distance between the actual output result of the discriminator and a target output result of the generator according to a generator cost function, and the computing unit is coupled to the cost function unit, and is configured to calculate a gradient of the first sample and a gradient of the second sample according to the first distance obtained by the

19 discriminator cost function, and add the gradient of the first sample and the gradient of the second sample according to the first distance to obtain a first gradient, and is further configured to calculate a gradient of the first sample according to the second distance obtained by the generator cost function as a second gradient.

2. The generative adversarial network device according to claim 1, further comprising:
a weight updating unit, wherein the weight updating unit is coupled to the computing unit, and configured to alternately adjust a group of conductance values of the first memristor array of the generator and a group of conductance values of the second memristor array of the discriminator; the group of conductance values of the second memristor array of the discriminator is adjusted according to the first gradient; and the group of conductance values of the first memristor array of the generator is adjusted according to the second gradient.

3. The generative adversarial network device according to claim 2, wherein the weight updating unit is further configured to:
obtain a group of initial conductance values of the second memristor array of the discriminator;
adjust the group of initial conductance values of the second memristor array of the discriminator based on a sign of the first gradient to obtain a group of adjusted conductance values of the second memristor array of the discriminator;
determine whether a direction of change of the group of adjusted conductance values relative to the group of initial conductance values in the second memristor array is consistent with the sign of the first gradient; and
if the direction of change of the group of adjusted conductance values relative to the group of initial conductance values in the second memristor array is consistent with the sign of the first gradient or a count of adjustment times of the group of conductance values of the second memristor array reaches a predetermined count of times, stop adjustment of the group of conductance values of the second memristor array in the discriminator, or,
if the direction of change of the group of adjusted conductance values relative to the group of initial conductance values in the second memristor array is not consistent with the sign of the first gradient, re-adjust the group of conductance values of the second memristor array based on the sign of the first gradient.

4. The generative adversarial network device according to claim 2, wherein the weight updating unit is further configured to:
obtain a group of initial conductance values of the first memristor array of the generator;
adjust the group of initial conductance values of the first memristor array of the generator based on a sign of the second gradient to obtain a group of adjusted conductance values of the first memristor array of the generator;
determine whether a direction of change of the group of adjusted conductance values relative to the group of initial conductance values in the first memristor array is consistent with the sign of the second gradient; and
if the direction of change of the group of adjusted conductance values relative to the group of initial conductance values in the first memristor array is consistent with the sign of the second gradient or a count of adjustment times of the group of conductance values of

20 the first memristor array reaches a predetermined count of times, stop adjustment of the group of conductance values of the first memristor array in the generator, or,
if the direction of change of the group of adjusted conductance values relative to the group of initial conductance values in the first memristor array is not consistent with the sign of the second gradient, re-adjust the group of conductance values of the first memristor array based on the sign of the second gradient.

5. The generative adversarial network device according to claim 1, further comprising:
a filtering unit, wherein the filtering unit is coupled to the generator and the discriminator, and is configured to filter an output signal of the first memristor array of the generator before the output signal of the first memristor array of the generator is outputted, and to filter an output signal of the second memristor array of the discriminator before the output signal of the second memristor array of the discriminator is outputted.

6. A training method for a generative adversarial network device, wherein the generative adversarial network device comprises:
a generator, configured to generate a first sample according to an input data, and comprising a first memristor array as a first weight array; and
a discriminator, coupled to the generator, comprising a second memristor array as a second weight array, and configured to receive the first sample and be trained based on the first sample;
the training method comprises:
causing the generator to generate the first sample according to the input data;
inputting the first sample into the discriminator and training the discriminator based on the first sample;
inputting a second sample as a real sample into the discriminator and training the discriminator based on the second sample;
obtaining a first distance between an actual output result of the discriminator and a target output result of the discriminator according to a discriminator cost function;
calculating a gradient of the first sample and a gradient of the second sample according to the first distance obtained by the discriminator cost function, and adding the gradient of the first sample and the gradient of the second sample to obtain a first gradient; and
adjusting a group of conductance values of the second memristor array of the discriminator according to the first gradient.

7. The training method according to claim 6, wherein the adjusting the group of conductance values of the second memristor array of the discriminator according to the first gradient, comprises:
obtaining a group of initial conductance values of the second memristor array of the discriminator;
adjusting the group of initial conductance values of the second memristor array of the discriminator based on a sign of the first gradient to obtain a group of adjusted conductance values of the second memristor array of the discriminator;
determining whether a direction of change of the group of adjusted conductance values relative to the group of initial conductance values in the second memristor array is consistent with the sign of the first gradient; and
if the direction of change of the group of adjusted conductance values relative to the group of initial conductance values in the second memristor array is consistent with the sign of the first gradient or a count of adjustment times of the group of conductance values of the second memristor array reaches a predetermined count of times, stopping adjustment of the group of conductance values of the second memristor array in the discriminator, or, if the direction of change of the group of adjusted conductance values relative to the group of initial conductance values in the second memristor array is not consistent with the sign of the first gradient, re-adjusting the group of conductance values of the second memristor array of the discriminator based on the sign of the first gradient.

8. The training method according to claim 6, further comprising:

obtaining a second distance between an actual output result of the discriminator and a target output result of the generator according to a generator cost function;

calculating a gradient of the first sample according to the second distance obtained by the generator cost function as a second gradient; and adjusting a group of conductance values of the first memristor array of the generator according to the second gradient.

9. The training method according to claim 8, wherein the adjusting the group of conductance values of the first memristor array of the generator according to the second gradient, comprises:

obtaining a group of initial conductance values of the first memristor array of the generator;

adjusting the group of initial conductance values of the first memristor array of the generator based on a sign of the second gradient to obtain a group of adjusted conductance values of the first memristor array of the generator;

determining whether a direction of change of the group of adjusted conductance values relative to the group of initial conductance values in the first memristor array is consistent with the sign of the second gradient; and if the direction of change of the group of adjusted conductance values relative to the group of initial conductance values in the first memristor array is consistent with the sign of the second gradient or a count of adjustment times of the group of conductance values of the first memristor array reaches a predetermined count of times, stopping adjustment of the group of conductance values of the first memristor array in the generator, or, if the direction of change of the group of adjusted conductance values relative to the group of initial conductance values in the first memristor array is not consistent with the sign of the second gradient, re-adjusting the group of conductance values of the first memristor array based on the sign of the second gradient.

10. The training method according to claim 6, further comprising:

filtering an output signal of the first memristor array of the generator before the output signal of the first memristor of the generator is outputted, and filtering an output signal of the second memristor array of the discriminator before the output signal of the second memristor array of the discriminator is outputted.

* * * * *